Nov. 8, 1949 P. J. DE KONING 2,487,112
PHOTOMETRIC APPARATUS FOR TESTING
THE CLEANLINESS OF DISHES
Filed April 17, 1947 2 Sheets-Sheet 1

Paul J. DeKoning INVENTOR

BY
Richard A. Parsons
ATTORNEY

Nov. 8, 1949   P. J. DE KONING   2,487,112
PHOTOMETRIC APPARATUS FOR TESTING
THE CLEANLINESS OF DISHES
Filed April 17, 1947   2 Sheets-Sheet 2

Paul J. DeKoning  INVENTOR

BY
Richard A. Parsons
ATTORNEY.

Patented Nov. 8, 1949

2,487,112

UNITED STATES PATENT OFFICE 2,487,112

PHOTOMETRIC APPARATUS FOR TESTING THE CLEANLINESS OF DISHES

Paul J. De Koning, East Lansing, Mich., assignor to National Sanitation Foundation, Ann Arbor, Mich., a corporation of Michigan Application April 17, 1947, Serial No. 742,078

3 Claims. (Cl. 88—14)

This invention relates to devices for photometrically measuring the cleanliness of dishes.

The invention is particularly adapted for testing the efficiency of dish washing machines. It is intended to be used in conjunction with an apparatus for uniformly soiling dishes which is disclosed in my copending application for Article coating apparatus, Serial No. 742,077, filed April 17, 1947. In carrying out such tests a number of dishes are uniformly coated with a soiling medium. They are then washed for a predetermined period in the dish washing machine to be tested, after which the cleanliness of the dishes is measured by photometrically comparing the light reflected therefrom with a perfectly clean dish.

The principal object of the present invention is to provide a simple apparatus for photometrically measuring the light reflecting quality of various objects, particularly dishes.

A further object of the invention is to provide such an apparatus in which a light source and photometer for measuring reflected light are arranged to be reciprocated relative to the object whereby to permit of readings at various points on the dish.

A still further object is to provide such an apparatus in which the light source and photometer are arranged so that as the light source and photometer are reciprocated, the light beam in inclined at various angles in accordance with the configuration of the article being tested.

These objects will more fully appear in the following specification when read in connection with the accompanying drawings, wherein.

Figure 1:
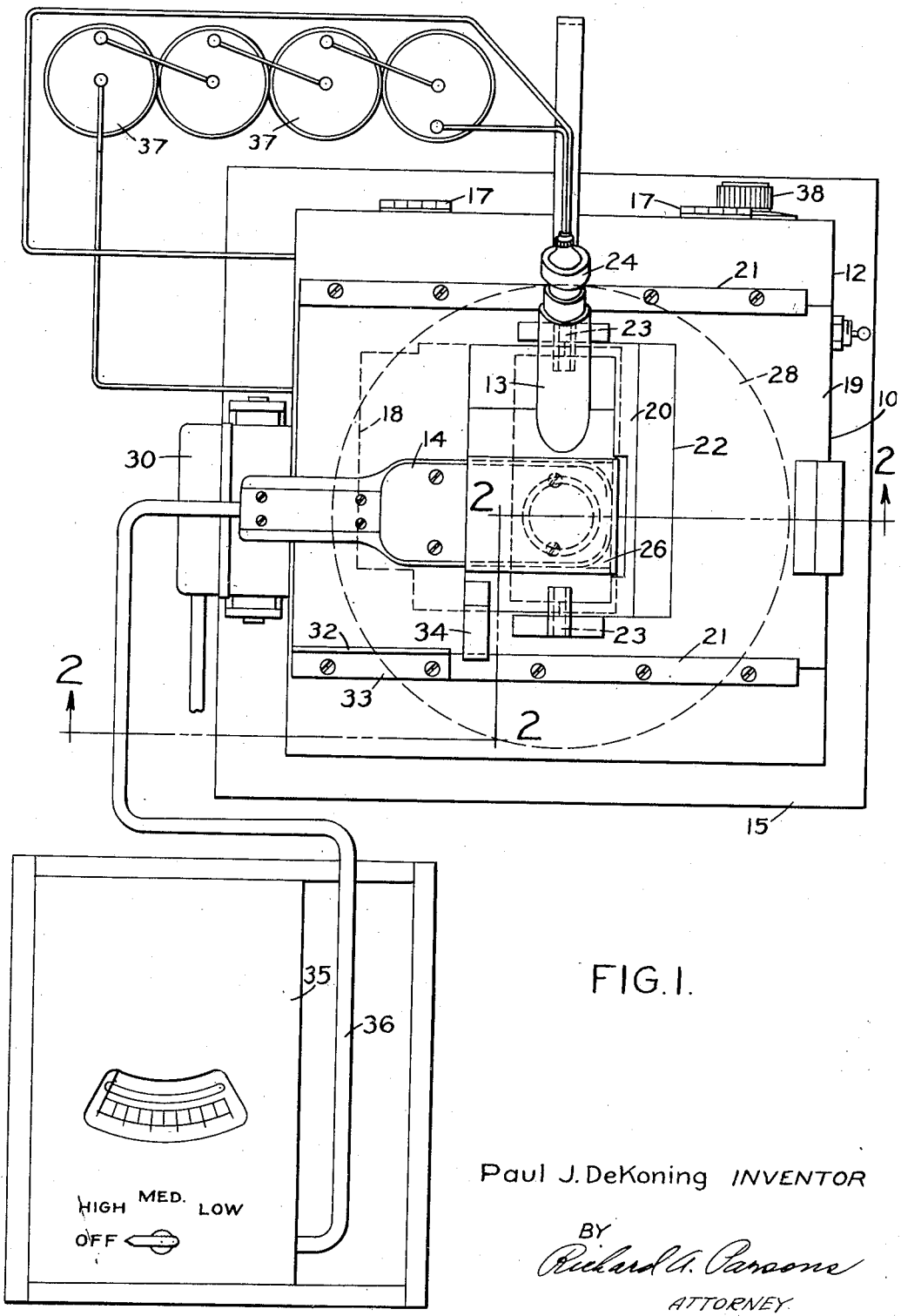
Figure 1 is a plan view of the apparatus embodying the present invention.

In its basic essentials the present invention comprises a substantially light tight housing 10, a motor driven rotary turntable 11 therein for supporting a dish to be tested, and a cover 12 for the housing which carries a light source 13 and a photometer 14. The cover is designed to be reciprocated relative to the housing whereby to permit measuring the reflecting qualities of a dish in different zones throughout its horizontal extent.

The housing 10 is a rectangular light tight box having a base 15 and upstanding side walls 16. The cover 12 is hinged to one of the side walls 16 by a hinge 17 to permit access to the interior of the housing. A large opening 18 is formed in the cover 12. The opening 18 is closed by a generally rectangular closure which comprises an outer section 19 and an inner section 20. The outer section is located over the opening 18 and is held in position by means of parallel guideways 21 of angular configuration. The outer section 19 is slidable transversely of the cover 12 in the guideways 21.

A generally rectangular opening 22 is formed in the outer section 19. This opening 22 is closed by the aforementioned inner section 20. The inner section is preferably coplanar with the outer section and is pivotally connected to the outer section by pivots 23. The pivots 23 are in aligned relationship parallel to the plane of the cover 12.

Figure 3:
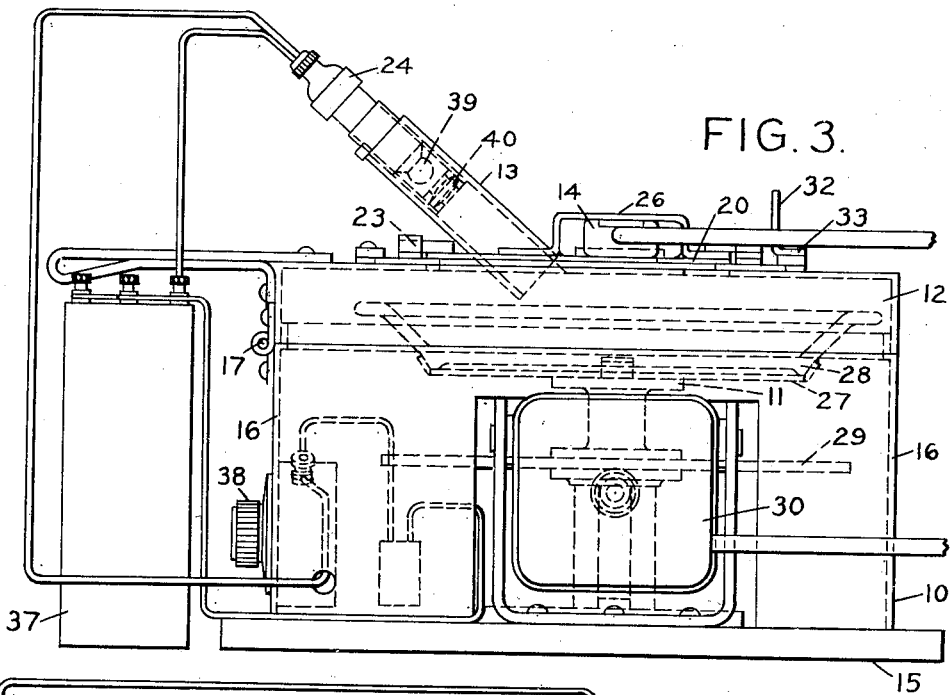
Figure 3 is a side elevational view of the device shown in Figure 1.

The light source 13 preferably comprises a small electric light bulb 39. The bulb 39 is mounted in a socket 24 which is secured within a tube 25. Also mounted within the tube 25 is a lens 40 which concentrates the light from the bulb 39 into a narrow beam. The tube 25 extends through a small opening in the inner section 20 of the closure and is inclined at an angle of approximately 45 degrees (see Figure 3).

The photometer 14 may be a standard light meter of the photo-electric cell type. It is mounted in a suitable bracket 26 which is fixedly attached to the inner section 20 of the closure for the opening 18. The light receiving portion of the photometer 14 is arranged over a small opening in the inner section 20 so as to receive light reflected from the dish within the housing 10.

The rotary turntable 11 is mounted within the housing 10 on an upright spindle 41. The turntable has a top plate 27 arranged to receive a dish 28 of a configuration decided upon as standard for the purpose of the aforementioned tests. The turntable is driven by means of an electric motor 30 through a friction drive consisting of a disk 31 on the motor shaft and a disk 29 on the spindle 41.

Figure 2:
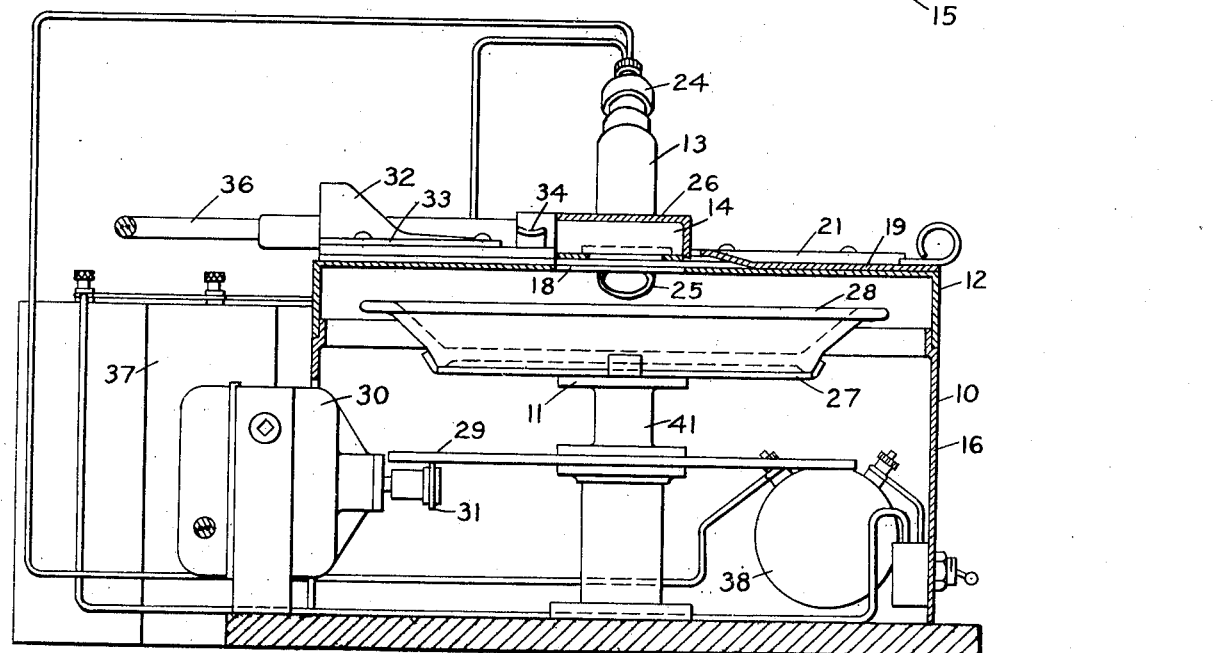
Figure 2 is a cross-sectional view taken on substantially the line 2—2 of Figure 1.

A cam 32 is mounted upon the cover 12. This cam is preferably a metal plate of the configuration shown in Figure 2. The cam is provided with a horizontal flange 33 for attachment of the cam to the cover. Preferably the inclined cam surface of the cam 32 is parallel to the inclined rim of the dish 28. A cam follower, which is a metal strip 34, is fixedly attached at one corner to the inner section 20 of the closure for the opening 18, in a position to engage the cam 32 as the closure is reciprocated.

The photometer 14 is connected to a standard milliammeter 35 by means of a conductor 36 so that minute electrical currents generated by the electric cell in the photometer 14 will register on the milliammeter.

The light bulb 29 is energized by means of a plurality of dry cells 37 connected in series. In the light bulb circuit is a conventional rheostat 38 by means of which the intensity of the light from the light bulb may be varied.

In using this invention, a dish of the aforementioned standard shape, and of a known and preferably perfect cleanliness, is placed upon the turntable 11. The motor 30 is started. This rotates the dish 28 at a relatively slow speed. The light source 13 is turned on and a reading of the milliammeter 35 taken. The closure on the cover 12 is moved laterally (to the left, as viewed in Figure 1) and readings taken at predetermined points during the travel of the closure. During the initial movement of the closure the inner section 20 of the closure is maintained in a horizontal position so that the light rays are reflected from the upper horizontal surface of the bottom of the dish. When the light beam strikes the inclined rim of the dish the cam follower 34 engages the inclined edge of the cam 32, causing the inner section 20 of the closure to tilt. The beam of light is then directed toward the rim of the dish at the same angle as it made with the bottom of the dish when the beam struck the bottom. Accurate readings can thus be obtained even on the inclined rim.

After the standard readings are thus obtained, the clean dish is removed and comparable readings taken from dishes which have been first soiled to a predetermined degree and then washed in the washing machine to be tested. The readings taken on the soiled dishes are made in exactly the same way as that previously described. The efficiency of the washing process, or that of the washing machine can then be determined by comparing the readings of the photometer.

It is possible to utilize a suitable scale on the milliammeter which will permit of direct readings of the light reflecting qualities of the various dishes.

From the foregoing it will be seen that the present invention provides an extremely simple means for accurately testing the cleanliness of dishes by photometrically measuring the light reflecting therefrom over the entire areas of the dishes.

The scope of the invention is indicated in the appended claims.

I claim:

1. Apparatus for measuring the reflecting quality of an object comprising a housing, said housing including a cover having a large opening therethrough, a closure for said opening mounted on said cover for horizontal reciprocation relative thereto, said closure comprising an outer section and an inner section pivotally connected to the outer section, a light source mounted on said inner section and arranged to direct a beam of light downwardly into said housing, a photometer mounted on said inner section and arranged to receive light from said light source reflected from within said housing, a cam on said cover adjacent said closure, a cam follower connected to said inner section and cooperating with said cam to pivot said inner section during reciprocatory movement of said closure, and an article support within said housing for supporting a light reflecting article in the path of said light beam and in a position to reflect light from said source to said photometer.

2. Apparatus for testing the cleanliness of dishes by photometrically measuring light reflected from said dishes comprising a rotatable turntable adapted to support a dish thereon, a housing for said turntable, said housing including a cover in spaced parallel relation to said turntable, said cover having a relatively large opening therein, a closure for said opening comprising an outer section reciprocably mounted on said cover and an inner section coplanar with said outer section and pivotally connected thereto on an axis parallel to said turntable, a light source and a photometer carried by said inner section, said light source being arranged to direct a light beam onto a dish placed on said turntable and said photometer being positioned to receive rays of light reflected from said dish, a cam on said cover, and a cam follower fixedly connected to said inner section and cooperating with said cam for pivoting said inner section during at least a portion of the reciprocatory travel of said closure.

3. Apparatus for measuring the reflecting quality of an object comprising a housing, said housing having a large opening in the top thereof, guide means mounted on said housing adjacent opposite edges of said opening, a closure for said opening, said closure comprising supporting means slidably associated with said guide means, and a cover section pivotally connected to said supporting means, a light source mounted on said cover and arranged to direct a beam of light downwardly into said housing, a photometer mounted on said cover and arranged to receive light from said light source reflected from within said housing, a cam on said housing adjacent said opening, a cam follower connected to said cover and cooperating with said cam to pivot said cover during reciprocatory movement of said closure, and an article support within said housing for reflecting a light supporting article in the path of said light beam and in a position to reflect light from said source to said photometer.

PAUL J. DE KONING.

REFERENCES CITED

The following references are of record in the file of this patent:

UNITED STATES PATENTS

| Number | Name | Date |
|---|---|---|
| 1,949,619 | Pfund | Mar. 6, 1934 |
| 2,032,515 | Troup | Mar. 3, 1936 |
| 2,051,695 | Glacy | Aug. 18, 1936 |
| 2,127,161 | Cook | Aug. 16, 1938 |
| 2,286,836 | Sachtleben | June 16, 1942 |